US011792872B2

(12) United States Patent
Somasandharam et al.

(10) Patent No.: US 11,792,872 B2
(45) Date of Patent: Oct. 17, 2023

(54) METHODS AND APPARATUSES ASSOCIATED WITH REESTABLISHMENT OF A NETWORK CONNECTION WITH A CHILD NODE

(71) Applicant: Intel Corporation, Santa Clara, CA (US)

(72) Inventors: Prahbu Somasandharam, Bayan Lepas (MY); Pushpamalar Mukilan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/629,751

(22) Filed: Feb. 24, 2015

(65) Prior Publication Data

US 2016/0249400 A1     Aug. 25, 2016

(51) Int. Cl.
*H04W 76/19*     (2018.01)

(52) U.S. Cl.
CPC .................................. *H04W 76/19* (2018.02)

(58) Field of Classification Search
CPC ........... H04L 61/6022; H04L 29/12839; H04L 63/1416; H04L 45/28
See application file for complete search history.

(56) References Cited

U.S. PATENT DOCUMENTS

| | | | |
|---|---|---|---|
| 5,978,812 A * | 11/1999 | Inokuchi | G06F 3/0607 |
| 2007/0066308 A1 * | 3/2007 | Andric | H04L 45/46 |
| | | | 455/445 |
| 2007/0195794 A1 * | 8/2007 | Fujita | H04L 12/4633 |
| | | | 370/395.53 |
| 2009/0147699 A1 * | 6/2009 | Ruy | H04L 29/12301 |
| | | | 370/254 |
| 2010/0112950 A1 * | 5/2010 | Haartsen | H04B 5/0056 |
| | | | 455/41.3 |
| 2013/0058354 A1 * | 3/2013 | Casado | H04L 12/4633 |
| | | | 370/401 |
| 2013/0077664 A1 * | 3/2013 | Lee | H04B 1/38 |
| | | | 375/222 |
| 2015/0106891 A1 * | 4/2015 | Soni | H04L 63/0861 |
| | | | 726/6 |
| 2015/0245402 A1 * | 8/2015 | Mochizuki | H04W 36/22 |
| | | | 370/331 |
| 2015/0256538 A1 * | 9/2015 | Chang | H04W 12/06 |
| | | | 726/4 |

(Continued)

FOREIGN PATENT DOCUMENTS

CN     1736062 A     2/2006
CN     102724172 A     10/2012

*Primary Examiner* — Huy D Vu
*Assistant Examiner* — Bao G Nguyen
(74) *Attorney, Agent, or Firm* — Compass IP Law PC (57) ABSTRACT

In embodiments, a device may include a storage device, a wireless transceiver to send and receive data, and a control module coupled with the storage device and the wireless transceiver. In embodiments, the control module may establish a network connection, via the wireless transceiver, with a child node in response to an association request received from the child node. The control module may then store an identifier associated with the child node in the storage device to enable the network connection to be reestablished with the child node in the event that the network connection with the child node is lost. Other embodiments may be described and/or claimed.

19 Claims, 4 Drawing Sheets

(56) References Cited

U.S. PATENT DOCUMENTS

| | | | | |
|---|---|---|---|---|
| 2016/0021253 A1* | 1/2016 | Petit-Huguenin | ....... | H04L 65/00 |
| | | | | 370/260 |
| 2016/0154834 A1* | 6/2016 | Friedman | ................ | G06F 16/86 |
| | | | | 707/657 |
| 2016/0197560 A1* | 7/2016 | Leedham | ................ | H02M 7/00 |
| | | | | 363/78 |
| 2016/0249400 A1* | 8/2016 | Somasandharam | ... | H04W 76/19 |
| 2016/0373319 A1* | 12/2016 | Littlejohn | ........... | H04L 41/0853 |

* cited by examiner

Non-transitory computer-readable storage medium 402

Programming Instructions 404
Configured to cause a device, in response to execution of the programming instructions, to practice (aspects of) embodiments of the process of Fig. 2.

Fig. 4

METHODS AND APPARATUSES ASSOCIATED WITH REESTABLISHMENT OF A NETWORK CONNECTION WITH A CHILD NODE

TECHNICAL FIELD

Embodiments of the present disclosure are related to the field of networking, and in particular, to methods and apparatuses associated with reestablishment of a network connection with a child node.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In a personal area network (PAN), under the current state of the art, a child node that is orphaned from a parent node may need to rediscover the parent node prior to being able to reestablish a network connection with the parent node. This rediscovery of the parent node may consume time and resources.

DETAILED DESCRIPTION OF ILLUSTRATIVE EMBODIMENTS

Methods, computer-readable media, and devices associated with reestablishment of a network connection with a child node are discussed herein. In embodiments, a device may include a persistent storage device, a wireless transceiver to send and receive data, and a control module coupled with the storage device and the wireless transceiver. The control module may receive an association request from the child node and, in response, may establish a network connection, via the wireless transceiver, with the child node. Once a network connection with the child node has been established, the control module may be configured to store an identifier associated with the child node in the storage device. The control module may be configured to utilize such an identifier to enable the network connection to be reestablished with the child node, in the event that the network connection with the child node is lost or severed, without the need for the child node to perform the entirety of another association process to rejoin the network and reestablish the network connection. (Note: for the purpose of this disclosure, the terms "lost" and "severed" may be considered as synonmymous.)

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
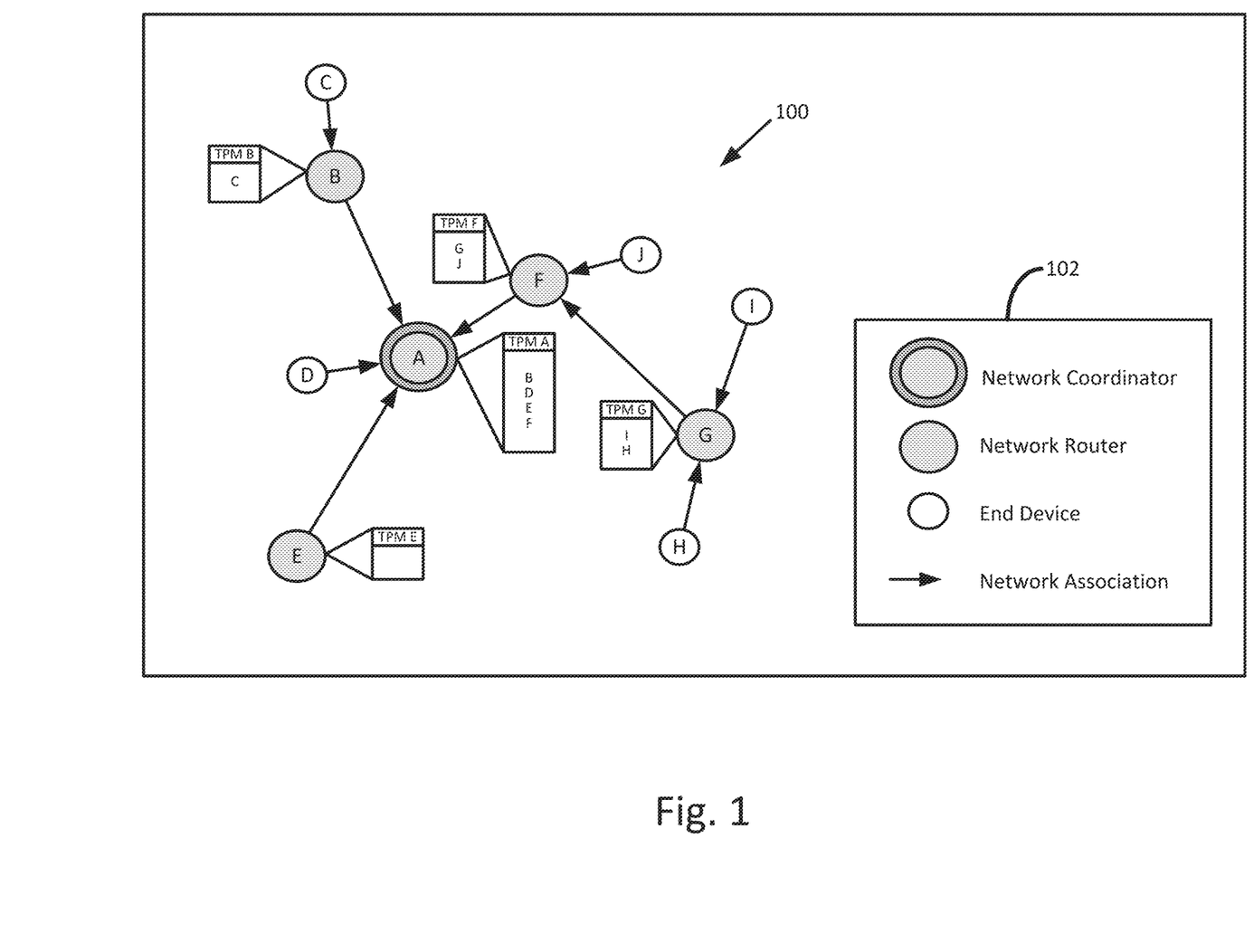
FIG. 1 depicts an illustrative networking environment, in accordance with various embodiments of the present disclosure.

FIG. 1 depicts an illustrative networking environment 100, in accordance with various embodiments of the present disclosure. As depicted, networking environment 100 may include a number of devices, such as network devices, represented here as nodes A-J. As indicated in box 102, these network devices may take the form of a network coordinator (e.g., node A), a network router (e.g., nodes B, E, F, and G), or an end device (e.g., nodes C, D, H, I, and J). As used herein, a network coordinator may refer to a node that is configured to initiate formation of the network. A network router on the other hand may refer to a node configured to act as an intermediary device to route data to and from other nodes connected directly or indirectly with the network router. Finally, an end device may be a terminal device that may produce or consume data but is not capable of routing data or otherwise supporting any other nodes. In some embodiments, the network coordinator and network routers may take the form of gateway devices which may act as either a network coordinator or a network router. Such a gateway device may be referred to alternatively in the art (e.g., in the context of IEEE 802.15.4-2006 standard) as a full-function device (FFD) while an end device may be referred to alternatively in the art as a reduced-function device (RFD).

As depicted, networking environment 100 may include a network coordinator, node A. As the network coordinator, node A may be configured to initiate formation of networking environment 100 by, for example, selecting a channel on which the network is to operate and an identifier for the network. Such an identifier of the network may be, for example, a personal area network identifier (PAN ID). In some embodiments, node A, as the network coordinator, may also act as a bridge to other networks, such as the Internet, for example. In addition, the network coordinator may be configured to route data to and from other nodes and other networks that are connected directly or indirectly with the network coordinator.

In embodiments, node A, as the network coordinator of networking environment 100, and nodes B, E, F, and G, as network routers of the networking environment 100, may periodically transmit a beacon to one or more other network devices to enable those one or more other network devices to join the network through an association process, further described below in more detail. Through such an association process, networking environment 100 may grow to include additional network routers and/or additional end devices.

In embodiments, a device (e.g., a network router or an end device) seeking to join the network may be configured to perform an association process, such as that mentioned above, to initiate the joining of the network. To better illustrate such an association process, the association process will be described in reference to nodes A and B, however, any of the nodes depicted in networking environment 100, other than node A as the network coordinator, may have utilized a similar process to initially join networking environment 100.

The association process may begin with a discovery procedure in which the joining device, node B, may be configured to discover networks within an operational range of node B. Such a discovery procedure may be accomplished by node B, for example, scanning network beacons to identify available networks. As an illustrative example, such a discovery procedure for the ZigBee protocol may be initiated by issuing an NLME-NETWORK-DISCOVERY.request from the application layer to the network layer of the ZigBee stack. In response, the network layer may issue an MLME-SCAN.request to the medium access control (MAC) layer of the ZigBee stack. The MAC layer may then perform an active or passive scan for available networks. As available networks are discovered, the MAC layer may return information concerning the discovered networks in respective MLME-BEACON-NOTIFY.indication primitives to the network layer. The MAC layer may then indicate the success or failure of the scan by returning an MLME-SCAN.confirm to the network layer. The network layer may then return an NLME-NETWORK-DISCOVERY.confirm containing network information on any available networks to the application layer. This network information may include PAN IDs of the available networks, the channels the available networks operate on, whether the available networks permit joining, etc.

Once the available networks, and any applicable network information, are identified, node B may be configured to perform a network selection procedure in which node B may select a compatible network to join from the available networks identified in the discovery process. Returning to the ZigBee example, such a compatible network may be determined by the application layer which may base the selection of a compatible network on any available network information. Once a compatible network has been identified, the device may select, based upon various criteria, an access point, for example, node A, of the compatible network to transmit an association request to. Such an access point may be, for example, the network coordinator, as is being discussed, or one of the network routers of the compatible network. The criteria utilized for selecting the access point of the compatible network may include any pertinent criteria, or combination of criteria, such as, signal quality, capacity, etc.

Once the access point of the compatible network is selected, node B may transmit an association request to the selected access point, in this example, node A. In response to the association request, node A may accept the association request and allocate an address on the network to node B. In embodiments, this address may uniquely identify node B on the network. Returning again to the ZigBee example, such an association request may be initiated by issuing an NLME-JOIN.request from the application layer to the network layer. The network layer may in turn issue an MLME-ASSOCIATE.request to the MAC layer which may then perform an association procedure with the selected access point. In this association procedure, a 64-bit extended MAC address of node B may be passed to the access point and the access point may allocate and return a 16-bit logical address that may uniquely identify node B within the network. The MAC layer may respond to the network layer in MLME-ASSOCIATE.confirm which may contain the address allocated to the requesting node, node B. The network layer may then pass along this information to the application layer in an NLME-JOIN.confirm response.

Once the association request has been accepted by node A and an address has been allocated to node B, node B may be configured to perform an authentication procedure to authenticate itself to node A. Returning again to the ZigBee example, such an authentication process may be performed at the application layer.

In the above described scenario, node B may be considered to be a child node of node A, which may be considered the parent node. As depicted, nodes B, D, E, and F are all child nodes of node A. As such, nodes D, E, and F may have utilized an association procedure similar to that described above in reference to node B to establish a network connection with node A. As depicted, the network association of a child node includes an arrow that points to that child node's parent node.

In embodiments, node A may be configured to store an identifier associated with node B in a persistent storage device, depicted here by trusted platform module A (TPM A), upon successfully establishing a network connection with node B. In some embodiments this identifier may include either, or both, of the 64-bit extended MAC address or the 16-bit logical address discussed above. As used herein, a persistent storage device may refer to a storage device capable of maintaining state in the absence of operational power or during a reset, such as, but not limited to, non-volatile dynamic random access memory (DRAM) like ferroelectric RAM, magnetoresistive RAM, phase change RAM, and so forth. In such embodiments, node A may be further configured to utilize the identifier associated with node B to initiate the reestablishment of the network connection with node B in the event the network connection with node B is severed. Storing the identifier in a persistent storage device may enable node A to maintain the identifier associated with node B in the event the network connection is severed due to, for example, loss of power or reset of node A.

As an example, if node A were to lose power, the network connection between node A and node B may be severed, thereby orphaning node B. In such a scenario, one method of reestablishing the connection would be to have node B repeat the association process described above in order to rejoin the network. Repeating the association process described above may, however, unnecessarily waste time and resources. By configuring node A to initiate reestablishing the network connection with node B, the association process described above, or at least portions of the association process described above, may be able to be omitted which may reduce the amount of time required to reestablish the network connection with node B, when compared with the association process described above.

As an example, in some embodiments, this reestablishing the network connection with node B may be accomplished utilizing a direct join procedure. In such embodiments, the identifier of node B may include the address on the network allocated to node B (e.g., the 16-bit logical address discussed above) and the 64-bit extended MAC address of node B, which may be utilized by node A in reestablishing the network connection. Returning to the Zigbee example, the direct join procedure may be initiated at the application layer of the access node, node A, by retrieving the identifier of node B from TPM A. Once the identifier has been retrieved, the application layer of node A may issue an NLME-JOIN.request to the network layer of node A that may include the identifier. In response, the network layer may allocate a current 16-bit logical address to node B. In some embodiments, this current 16-bit logical address may be a different 16-bit logical address than that included in the identifier of node B retrieved from TPM A. In such embodiments, node A may be configured to update the identifier of node B in TPM A to reflect this current 16-bit logical address. In other embodiments, node A may be configured to utilize the 16-bit logical address of the identifier of node B as the current 16-bit logical address. Once the network layer has established the current 16-bit logical address, the network layer may send an NLME-JOIN.confirm response to the application layer.

By utilizing the identifier of node B in the manner described above, the reestablishment of the network connection with node B may be able to occur in approximately 2 seconds, or less. For example, if node A initiates reestablishing the network connection with node B, in some embodiments, the discovery procedure described above in the association process may be skipped because node B would not need to determine available networks as one has already been selected. In such embodiments, however, node B may still perform the authentication procedure in order to maintain security of the network connection.

As depicted, the storage device may, in some embodiments, be a TPM integrated with node A. In such embodiments, the TPM may prevent manipulation of identifiers stored in the TPM. As a result, utilizing a TPM as the storage device may enable networking environment 100 to maintain a level of security, in reestablishing severed network connections, that may not be attainable if the storage device were not a TPM. It will be appreciated that this is merely an example embodiment and that other mechanisms for maintaining such security may be utilized in place of the TPM. Furthermore, in some embodiments security may not be an issue. In such embodiments, the storage device may be any conventional storage device.

While the discussion above was limited to nodes A and B, each child node of networking environment 100 is illustrated with a directional network association depicted by an arrow pointing from each child node to that child node's respective parent. As such, it will be appreciated that the directionality of the network association does not characterize a direction of data flow and that the data flow between nodes may be bidirectional. Each of these network associations may be formed in the same, or a similar, association process to that described above in reference to nodes A and B. In addition, each parent, or potential parent in the case of Node E, may have a storage device (e.g., TPM A-TPM G) integrated therewith that may be utilized by that parent to store identifiers of the child nodes of that parent node. Each of these parent nodes may then be able to utilize the identifiers in that respective parent node's storage device to reestablish a severed connection with any or all of that parent node's child nodes.

It will be appreciated that in some scenarios power may be lost to all, or a subgroup, of the parent nodes. In such scenarios, it will be appreciated that each parent node may successively utilize the stored identifiers to restore the entire network, or the subgroup of the network, which may save a great deal of time and resources when compared to having to rebuild the network through the association process.

In some embodiments, networking environment 100 may be a wireless personal area network (WPAN). In some embodiments, networking environment 100 may be a sensor network. In some embodiments, networking environment 100 may be part of a collection of internet of things (IOT). In such embodiments, end devices C, D, H, I, and/or J may represent IOT edge devices. It will be appreciated that, while the ZigBee protocol has been discussed above for illustrative purposes, the network depicted in networking environment 100 may be established utilizing any appropriate network protocol. Such network protocols may include, but are not limited to, WiFi network protocol, Bluetooth network protocol, ZWave network protocol, an internet protocol version 6 over low-power WPAN (6LoWPAN), a radio-frequency identification (RFID) network protocol, or a cellular network protocol.

Figure 2:
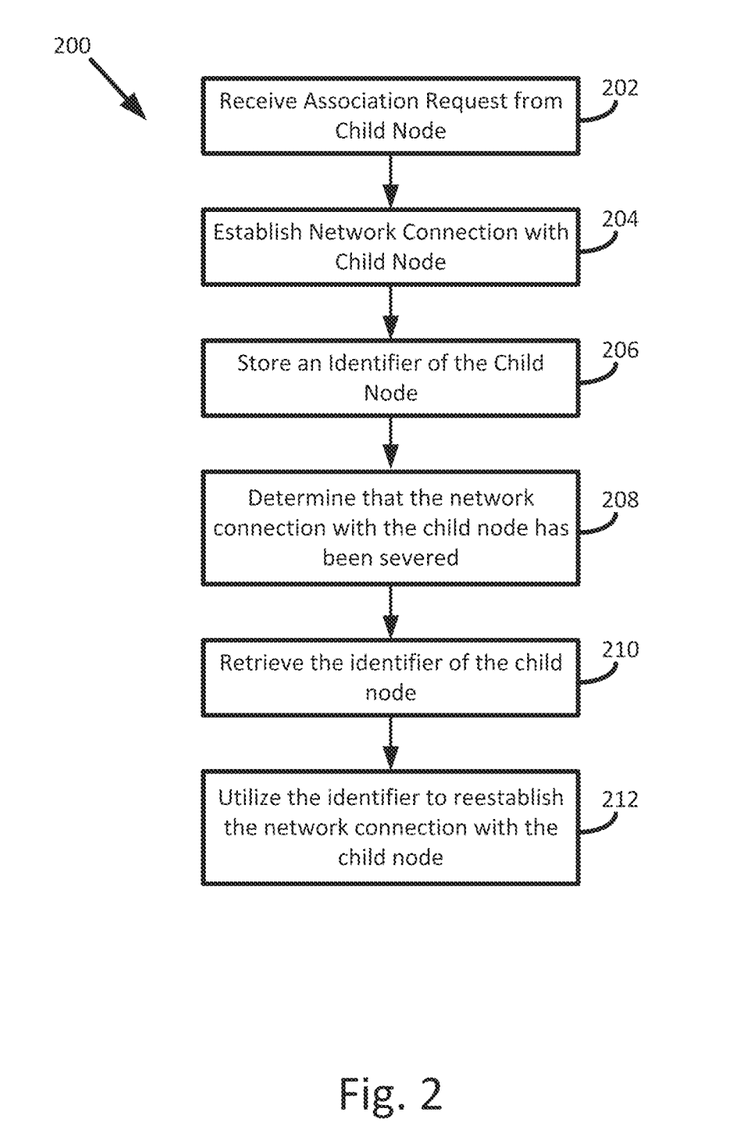
FIG. 2 illustrates an example process flow for reestablishing a network connection, in accordance with various embodiments of the present disclosure.

FIG. 2 illustrates an example process flow 200 for reestablishing a network connection, in accordance with various embodiments of the present disclosure. In embodiments, such a process flow may be carried out, for example, by a network device such as nodes A, B, E, F, or G depicted in FIG. 1 or having a control module and storage device (e.g., control module 302 and storage device 308 of FIG. 3) integrated therewith. The process flow may begin at block 202 where the network device may receive an association request from a child node. It will be appreciated that, at such a point in time, the child node may merely be a prospective child node because the child node has yet to establish a network connection with the parent, however, for the sake of simplicity, the phrase "child node" may be utilized to refer to either a prospective child node that has yet to establish a network connection with a parent node and an actual child node that has established such a connection. Such an association request may correspond with the association request described above in reference to the association process of FIG. 1.

In response to receiving the association request, the network device may accept the association request from the child node and may allocate a network address to the child node, thereby establishing a network connection at block 204 between the child node and the network device, which may also be referred to as a parent node. Once the network connection with the child node has been established, the network device may store an identifier of the child node in a storage device of the network device at block 206. Such an identifier and storage device may correspond with the identifier and storage device discussed in reference to either of FIG. 1 or 3. As such, in some embodiments, the storage device may be a trusted platform module (TPM) such as that depicted and discussed in reference to FIG. 1 or 3.

At block 208, the network device may determine, or detect, that the network connection with the child node has been severed. Such a determination may, in some embodiments, be made during a reset of the network device, after a power outage of the network device, for example. In such an embodiment, the existence of any identifiers in the storage device of the network device may be sufficient to indicate to the network device that a network connection with the child nodes identified by the identifiers has been severed. In other embodiments, such a determination may be made by the network device receiving an orphaned device transmission, such as, for example, a ZigBee orphaned device transmission, from any child nodes that have had a network connection with the network device severed. It will be appreciated that the above examples are merely meant to be illustrative and that any method of determining that a network connection has been severed, or lost, between the network device and any child nodes of the network device is within the scope of this disclosure.

In response to determining that a network connection with a child node has been severed, the network device may, at block 210, retrieve the identifier of the child node, from the storage device of the network device. As discussed above in reference to FIG. 1, this identifier may include the 16-bit logical address and the 64-bit extended MAC address. The network device may then utilize the identifier of the child node to initiate reestablishment of the network connection at block 212. Such a reestablishment of the network connection may correspond with the reestablishment of the network connection discussed above in reference to FIG. 1. As such, reestablishment of the network connection may be carried out by the network device performing a direct join procedure with the child node utilizing the identifier.

As discussed in reference to FIG. 1, the network device may be a network router, network coordinator, gateway device, or full-function device (FFD). In embodiments, the network connection may be part of a wireless personal area network (WPAN). Such a WPAN may be formed utilizing any appropriate network protocol, including, but not limited to, ZigBee network protocol, WiFi network protocol, Bluetooth network protocol, ZWave network protocol, an internet protocol version 6 over low-power WPAN (6LoWPAN), a radio-frequency identification (RFID) network protocol, or a cellular network protocol.

Figure 3:
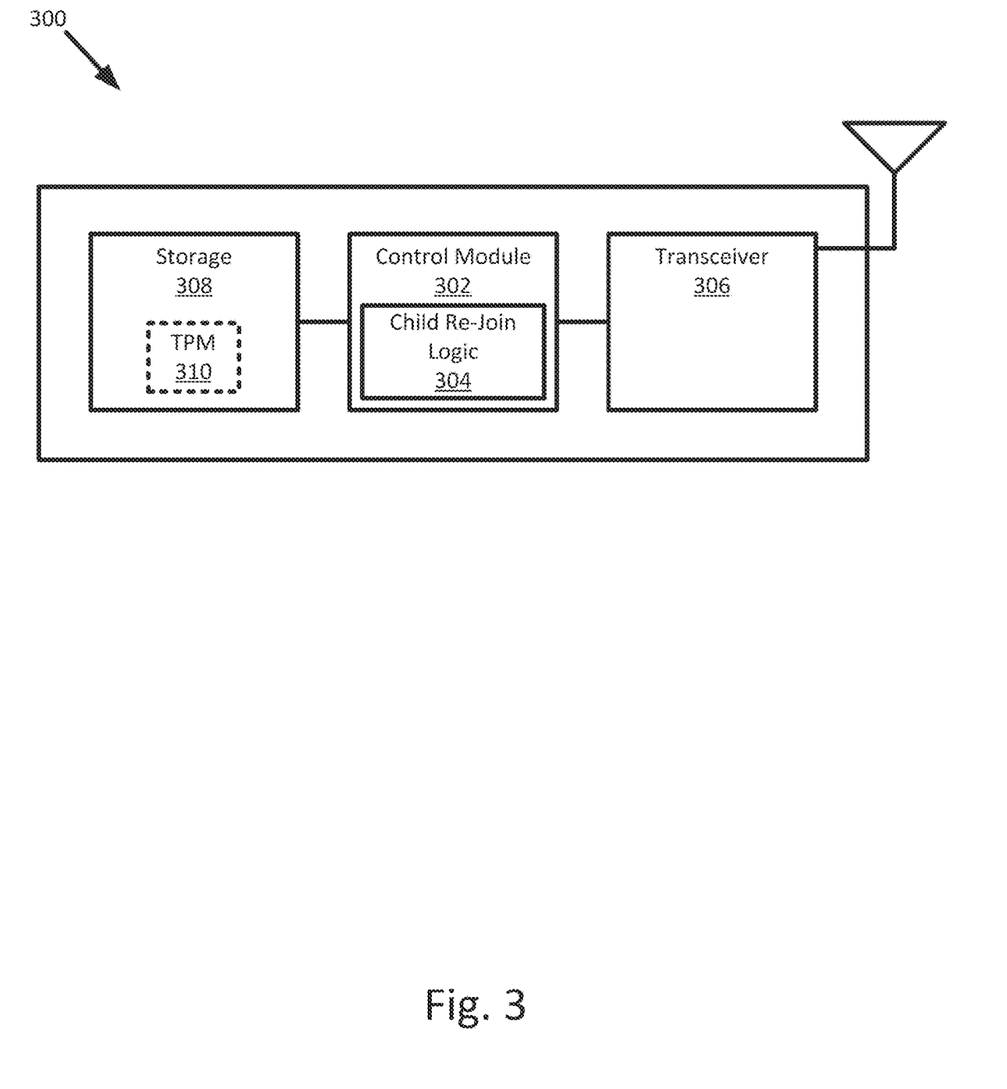
FIG. 3 is a schematic illustration of an example device, in accordance with various embodiments of the present disclosure.

Referring now to FIG. 3, wherein an example network device 300 suitable to implement the method described in reference to FIG. 1 or 2, in accordance with various embodiments, is illustrated. As shown, network device 300 may include control module 302 coupled with transceiver 306 and storage 308 by way of one or more buses. In embodiments, control module 302 may include child rejoin logic 304 to enable network device 300 to perform any portions of the method described in reference to FIG. 1 or 2. Child re-join logic 304 may be implemented as circuitry, software, or any combination thereof. In other embodiments, control module 302 may be a processor and child re-join logic 304 may be implemented in whole or in part as executable instructions stored in storage device 308 to be executed by control module 302 to cause network device 300 to perform any portion of the method described in reference to FIG. 1 or 2.

In embodiments, control module 302 may include one or more processors or processor cores, and memory. In embodiments, multiple processor cores may be disposed on a single die. In some embodiments, one or more of these processors may be microcontrollers that may be configured by child re-join logic 304 to perform any of the above described processes or any portion thereof. For the purpose of this application, including the claims, the terms "processor" and "processor cores" may be considered synonymous, unless the context clearly requires otherwise. Additionally, network device 300 may include a storage device 308 (such as that discussed above in reference to FIGS. 1 and 2), which may, for example, include a trusted platform module (TPM) 310.

Each of these elements may perform its conventional functions known in the art, in addition to any specialized functions described herein. In particular, storage device 308 may be employed to store a permanent copy of programming instructions implementing one or more of the operations described earlier, e.g., but not limited to, operations described above in reference to FIGS. 1 and 2. The various operations may be implemented by assembler instructions supported by control module 302 or high-level languages, such as, for example, C, that may be compiled into such instructions.

The permanent copy of the programming instructions may be placed into storage devices 308 in the factory, or in the field, through, for example, a distribution medium (not shown), such as a compact disc (CD), or through transceiver 306 (from a distribution server (not shown)). That is, one or more distribution media having an implementation of one or more processes described in reference to FIG. 1 or 2 may be employed to distribute these components to various computing devices.

The number, capability, and/or capacity of these elements 302-310 may vary, depending on the intended use of example network device 300

Figure 4:
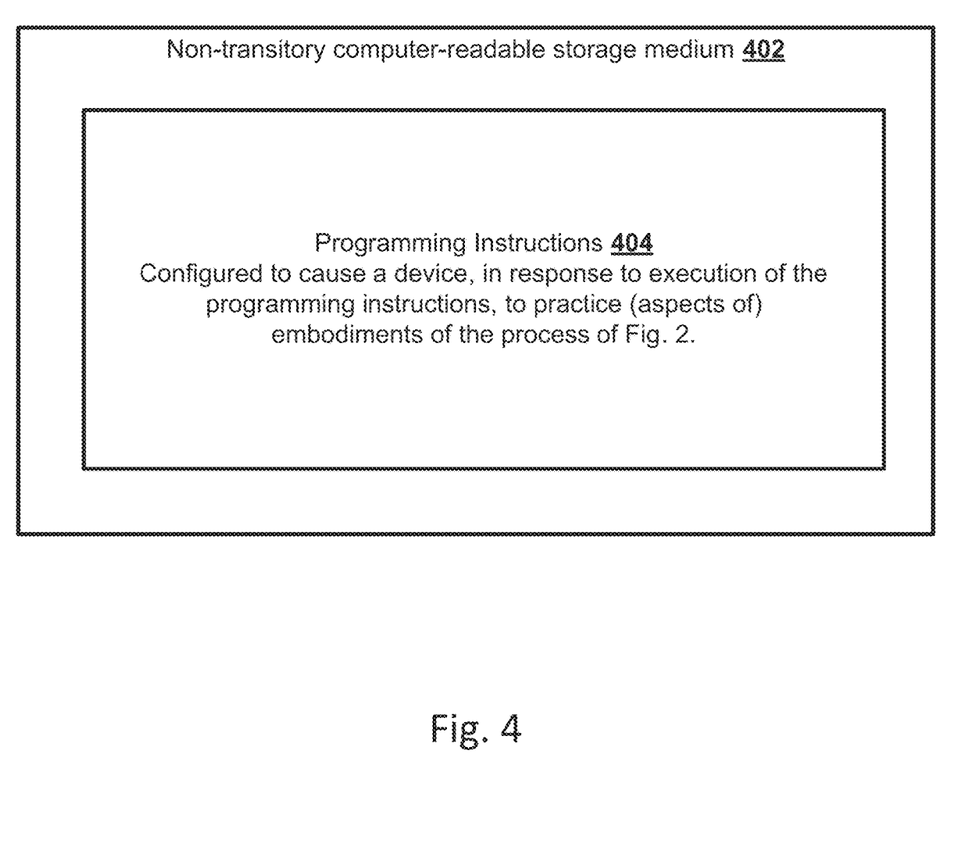
FIG. 4 illustrates an example non-transitory computer-readable storage medium having instructions configured to practice all or selected ones of the operations associated with the processes described above.

FIG. 4 illustrates an example non-transitory computer-readable storage medium having instructions configured to practice all or selected ones of the operations associated with the processes described above. As illustrated, non-transitory computer-readable storage medium 402 may include a number of programming instructions 404. Programming instructions 404 may be configured to enable a device, e.g., network device 300, in response to execution of the programming instructions, to perform one or more operations of the processes described in reference to FIGS. 1 and 2. In alternate embodiments, programming instructions 404 may be disposed on multiple non-transitory computer-readable storage media 402 instead. In still other embodiments, programming instructions 404 may be encoded in transitory computer-readable medium, such as signals.

Referring back to FIG. 3, for one embodiment, control module 302 may include at least one processor packaged together with memory having child-rejoin logic 304 configured to perform one or more operations of the processes described with reference to FIG. 1 or 2. For one embodiment, control module 302 may include at least one processor packaged together with memory having child-rejoin logic 304 configured to practice aspects of the methods described in reference to FIGS. 1 and 2 to form a System in Package (SiP). Such an SiP may be utilized in any suitable network device and may also include transceiver 306 and/or storage 308 integrated therewith. For one embodiment, control module 302 may include at least one processor integrated on the same die with memory having child re-join logic 304 configured to perform one or more operations of the processes described in reference to FIGS. 1 and 2. Such embodiments, may also include transceiver 306 and/or storage 308 integrated onto the same die. For one embodiment, control module 302 may include at least one processor packaged together with memory having child-rejoin logic 304 configured to perform one or more operations of the process described in reference to FIGS. 1 and 2 to form a System on Chip (SoC). Such an SoC may be utilized in any suitable network device and may also include transceiver 306 and/or storage 308 integrated therewith.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules or monitors may be subcomponents of a single module or monitor, or be split among several modules or monitors. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Some non-limiting examples are: Example 1 may include a device to reestablish a network connection comprising: a persistent storage device; a wireless transceiver to send and receive data; and a control module coupled with the storage device and the wireless transceiver, the control module to: establish a network connection, via the wireless transceiver, with a child node in response to an association request received from the child node; and store an identifier associated with the child node in the storage device to enable the network connection to be reestablished with the child node in the event that the network connection with the child node is severed.

Example 2 may include the subject matter of Example 1, wherein to enable the network connection to be reestablished with the child node after the network connection is severed, the control module is further to: retrieve the identifier from the storage device in response to detection that the network connection with the child node has been severed; and utilize the identifier to initiate reestablishment of the network connection.

Example 3 may include the subject matter of Example 2, wherein the control module is further to detect that the network connection with the child node has been severed.

Example 4 may include the subject matter of Example 3, wherein the control module is further to detect that the network connection with the child node has been severed based at least in part on detection of a power failure or reset of the device Example 5 may include the subject matter of any one of Examples 2-4, wherein the control module is further to utilize the identifier to initiate reestablishment of the network connection via a direct join procedure utilizing the identifier.

Example 6 may include the subject matter of any one of Examples 2-5, wherein the network connection is a secure network connection.

Example 7 may include the subject matter of any one of Examples 2-6, wherein the device is a gateway device for establishment of a wireless personal area network (WPAN).

Example 8 may include the subject matter of Example 7, wherein the WPAN is a ZigBee network, WiFi network, a Bluetooth network, a ZWave network, an internet protocol version 6 over low-power WPAN (6LoWPAN), a radio-frequency identification (RFID) network, or a cellular network.

Example 9 may include the subject matter of any one of Examples 1-8, wherein the identifier includes a 16-bit logical address and a 64-bit extended medium access control (MAC) address for the child node.

Example 10 may include the subject matter of any one of Examples 1-9, wherein the storage device is a trusted platform module.

Example 11 may include a method for reestablishing a network connection comprising: determining, by a device, that a network connection with a child node has been severed; retrieving, by the device, an identifier of the child node, from a persistent storage device of the device, in response to detecting that the network connection with the child node has been lost, wherein the identifier of the child node was previously stored in the storage device in response to successfully establishing a network connection with the child node via an association process initiated by the child node; and initiating, by the device, reestablishment of the network connection based at least in part on the retrieved identifier of the child node.

Example 12 may include the subject matter of Example 11, further comprising, prior to the determining: receiving, by the device, an association request from the child node; establishing, a network connection with the child node in response to receiving the association request; and storing the identifier of the child node in the storage device.

Example 13 may include the subject matter of either of Examples 11 or 12, wherein determining that a network connection with the child node has been severed is based at least in part on detecting, by the device, the occurrence of a power failure or reset of the device.

Example 14 may include the subject matter of any one of Examples 11-13, wherein initiating reestablishment of the network connection based at least in part on the retrieved identifier of the child node comprises performing a direct join procedure utilizing the identifier.

Example 15 may include the subject matter of any one of Examples 11-14, wherein the network connection is a secure network connection.

Example 16 may include the subject matter of any one of Examples 11-14, wherein the device is a gateway device for establishing of a wireless personal area network (WPAN).

Example 17 may include the subject matter of Example 16, wherein the WPAN is a ZigBee network, WiFi network, a Bluetooth network, a ZWave network, an internet protocol version 6 over low-power WPAN (6LoWPAN), a radio-frequency identification (RFID) network, or a cellular network.

Example 18 may include the subject matter of any one of Examples 11-17, wherein the identifier includes a 16-bit logical address and a 64-bit extended medium access control (MAC) address for the child node.

Example 19 may include the subject matter of any one of Examples 11-17, wherein the storage device is a trusted platform module.

Example 20 may include one or more computer-readable media having instructions stored thereon, wherein the instructions, in response to execution by a device, cause the device to: establish a network connection with a child node in response to an association request received from the child node; store an identifier associated with the child node in a persistent storage device of the device; retrieve the identifier from the storage device in response to detection that the network connection with the child node has been severed; and utilize the identifier to initiate reestablishment of the network connection.

Example 21 may include the subject matter of Example 20, wherein detection that the network connection with the child node has been severed is based at least in part on detection of the occurrence of a power failure or reset of the device.

Example 22 may include the subject matter of either of Examples 20 or 21, wherein to initiate reestablishment of the network connection comprises performance of a direct join procedure with identifier.

Example 23 may include the subject matter of any one of Examples 20-22, wherein the network connection is a secure network connection.

Example 24 may include the subject matter of any one of Examples 20-23, wherein the device is a gateway device for establishment of a wireless personal area network (WPAN).

Example 25 may include the subject matter of Example 24, wherein the WPAN is a ZigBee network, WiFi network, a Bluetooth network, a ZWave network, an internet protocol version 6 over low-power WPAN (6LoWPAN), a radio-frequency identification (RFID) network, or a cellular network.

Example 26 may include the subject matter of any one of Examples 20-25, wherein the identifier includes a 16-bit logical address and a 64-bit extended medium access control (MAC) address for the child node.

Example 27 may include the subject matter of any one of Examples 20-26, wherein the storage device is a trusted platform module.

Example 28 may include a device to reestablish a network connection comprising: means for determining that a network connection with a child node has been severed; means for retrieving an identifier of the child node, from a storage device, in response to detecting that the network connection with the child node has been lost, wherein the identifier of the child node was previously stored in the storage device in response to successfully establishing a network connection with the child node via an association process initiated by the child node; and means for initiating reestablishment of the network connection based at least in part on the retrieved identifier of the child node.

Example 29 may include the subject matter of Example 28, further comprising, prior to the determining: means for receiving an association request from the child node; means for establishing a network connection with the child node in response to receiving the association request; and means for storing the identifier of the child node in the storage device.

Example 30 may include the subject matter of either of Examples 28 or 29, wherein determining that a network connection with the child node has been severed is based at least in part on detecting, by the device, the occurrence of a power failure or reset of the device.

Example 31 may include the subject matter of any one of Examples 28-30, wherein the means for initiating reestablishment of the network connection based at least in part on the retrieved identifier of the child node comprises means for performing a direct join procedure utilizing the identifier.

Example 32 may include the subject matter of any one of Examples 28-31, wherein the network connection is a secure network connection.

Example 33 may include the subject matter of any one of Examples 28-32, wherein the device is a gateway device for establishing of a wireless personal area network (WPAN).

Example 34 may include the subject matter of Example 33, wherein the WPAN is a ZigBee network, WiFi network, a Bluetooth network, a ZWave network, an internet protocol version 6 over low-power WPAN (6LoWPAN), a radio-frequency identification (RFID) network, or a cellular network.

Example 35 may include the subject matter of any one of Examples 28-34, wherein the identifier includes a 16-bit logical address and a 64-bit extended medium access control (MAC) address for the child node.

Example 36 may include the subject matter of any one of Examples 28-35, wherein the storage device is a trusted platform module.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A device comprising:
   a storage device;
   a wireless transceiver to send and receive data; and
   application layer logic and network layer logic coupled with the storage device and the wireless transceiver, to cooperate to coordinate formation of a network with one or more child nodes, wherein:
   the application layer logic, in response to an association request received from a child node, to initiate a request to the network layer logic to perform an association procedure with the child node to establish a network connection, via the wireless transceiver, with the child node;

the network layer logic is to perform the association procedure with the child node to associate the child node with the device, including obtaining a media access control (MAC) address of the child node, from the child node, and allocate a logical address for the child node that uniquely identifies the child node in the network; and the application layer logic is to store an identifier associated with the child node in the storage device, the identifier including the MAC address of the child node obtained by the network layer logic, and the logical address of the child node allocated by the network layer logic;

wherein to coordinate formation of the network further includes:

the application layer logic retrieving the identifier, and providing the MAC address of the child node to the network layer logic to initiate automatic re-establishment of the network connection, via the wireless transceiver, with the child node, without waiting for another association request from the child node, based on detection of losing the network connection with the child node; and based on detection of losing the network connection with the child node, the network layer logic at the device performing a direct join procedure, as opposed to the association procedure, using a previous logical address of the child node or a newly allocated logical address to re-join the child node to the network.

2. The device of claim 1, wherein the application layer logic is to:
retrieve the identifier from the storage device, in response to detection that the network connection with the child node has been lost.

3. The device of claim 2, wherein the network layer logic is further to detect that the network connection with the child node has been lost.

4. A device comprising:
a trusted platform module;
a wireless transceiver to send and receive data; and
application layer logic and network layer logic coupled with the trusted platform module and the wireless transceiver, to cooperate to coordinate formation of a network with one or more child devices, wherein:
the application layer logic, in response to an association request received from a child node, is to initiate a request to the network layer logic to perform an association procedure with the child node to establish a network connection, via the wireless transceiver, with the child node;
the network layer logic is to perform the association procedure with the child node to associate the child node with the device, including obtaining a media access control (MAC) address of the child node, from the child node, and allocate a logical address for the child node that uniquely identifies the child node in the network; and
the application layer logic is to store an identifier associated with the child node in the trusted platform module, the identifier including the MAC address of the child node obtained by the network layer logic, and the logical address of the child node allocated by the network layer logic;

wherein to coordinate formation of the network further includes:
the application layer logic retrieving the identifier, and providing the MAC address of the child node to the network layer logic to initiate automatic re-establishment of the network connection, via the wireless transceiver, with the child node, without waiting for another association request from the child node, based on detection of losing the network connection with the child node; and
based on detection of losing the network connection with the child node, the network layer logic of the device performing a direct join procedure, as opposed to the association procedure, using a previous logical address of the child node or a newly allocated logical address to re-join the child node to the network.

5. The device of claim 2, wherein the device comprises a gateway device for establishment of a wireless personal area network (WPAN), and the child node comprises an Internet-of-Thing (IoT) device.

6. The device of claim 5, wherein the WPAN comprises a ZigBee network, WiFi network, a Bluetooth network, a ZWave network, an internet protocol version 6 over low-power WPAN (6LoWPAN), a radio-frequency identification (RFID) network, or a cellular network.

7. The device of claim 1, wherein the MAC address comprises a 64-bit extended MAC address.

8. The device of claim 4, wherein the device comprises a gateway device for establishment of a wireless personal area network (WPAN), and the child node comprises an Internet-of-Thing (IoT) device.

9. The device of claim 4, wherein the MAC address comprises a 64-bit extended MAC address.

10. A method comprising:
initiating, by application layer logic of a device, in response to an association request received from a child node, a request to network layer logic of the device to perform an association procedure with the child node to establish a network connection, via a wireless transceiver, with the child node;
performing, by network layer logic, an association procedure with the child node to associate the child node with the device, including obtaining a media access control (MAC) address of the child node, from the child node, and allocating a logical address for the child node that uniquely identifies the child node in the network;
storing, by the application layer logic, an identifier associated with the child node in a storage device, the identifier including the MAC address of the child node obtained by the network layer logic, and the logical address of the child node allocated by the network layer logic;
based on determining, by the device, that the network connection with a child node has been lost:
retrieving, by the application layer logic, the identifier of the child node, from the storage device, and providing the MAC address of the child node to the network layer logic to initiate automatic re-establishment of the network connection with the child node, without waiting for another association request from the child node;
performing, by the network layer logic at the device, a direct join procedure, as opposed to the association procedure, using a previous logical address of the child node or a newly allocated logical address to re-join the child node to the network.

11. The method of claim 10, comprising determining that the network connection with the child node has been lost based at least in part on detecting, by the device, an occurrence of a power failure or reset of the device.

12. The method of claim 10, wherein the network connection comprises a secure network connection.

13. The method of claim 10, wherein the device comprises a gateway device for establishing of a wireless personal area network (WPAN), and the child node is an Internet-of-Thing (IoT) device.

14. The method of claim 13, wherein the WPAN comprises a ZigBee network, WiFi network, a Bluetooth network, a ZWave network, an internet protocol version 6 over low-power WPAN (6LoWPAN), a radio-frequency identification (RFID) network, or a cellular network.

15. One or more non-transitory computer-readable media having instructions stored thereon, wherein the instructions, in response to execution by a device, cause the device operate application layer logic and network layer logic to cooperate to coordinate formation of a network with one or more child nodes, including :
- the application layer logic, in response to an association request received from a child node, initiates a request to the network layer logic to perform an association procedure with the child node to establish a network connection with the child node;
- the network layer logic performs the association procedure with the child node to associate the child node with the device, including obtaining a media access control (MAC) address from the child node, and allocating a logical address for the child node that uniquely identifies the child node in the network; and
- the application layer logic securely stores an identifier associated with the child node in a storage device of the device, wherein the identifier includes the MAC address of the child node obtained by the network layer logic, and the logical address of the child node allocated by the network layer logic, and wherein the storage device is a trusted platform module;

wherein to coordinate formation of the network further includes:
- the application layer logic retrieving the identifier, and providing the MAC address of the child node to the network layer logic to initiate automatic re-establishment of the network connection, with the child node, without waiting for another association request from the child node, based on detection of losing the network connection with the child node; and
- based on detection of losing the network connection with the child node, the network layer logic at the device performing a direct join procedure, as opposed to the association procedure, using a previous logic address of the child node or a newly allocated logical address to re-join the child node to the network.

16. The one or more non-transitory computer-readable media of claim 15, wherein detection of losing the network connection with the child node is based at least in part on detection of occurrence of a power failure or reset of the device.

17. The one or more non-transitory computer-readable media of claim 15, wherein the network connection comprises a secure network connection.

18. The one or more non-transitory computer-readable media of claim 15, wherein the device comprises a gateway device for establishment of a wireless personal area network (WPAN), and the child node comprises an Internet-of-Thing (IoT) device.

19. The device of claim 8, wherein the WPAN comprises a ZigBee network, WiFi network, a Bluetooth network, a ZWave network, an internet protocol version 6 over low-power WPAN (6LoWPAN), a radio-frequency identification (RFID) network, or a cellular network.

\* \* \* \* \*